United States Patent [19]
Nakano et al.

[11] Patent Number: 5,586,115
[45] Date of Patent: Dec. 17, 1996

[54] ADD-DROP MULTIPLEXER

[75] Inventors: Yukio Nakano, Zama; Keiji Tomooka, Yokohama, both of Japan

[73] Assignee: Hitachi, Ltd., Tokyo, Japan

[21] Appl. No.: 435,046

[22] Filed: May 8, 1995

[30] Foreign Application Priority Data

May 10, 1994 [JP] Japan ................................. 6-096058

[51] Int. Cl.⁶ ............................ H04J 3/08; H04J 14/08
[52] U.S. Cl. .......................... 370/376; 359/117; 370/388
[58] Field of Search ...................... 370/16, 55; 359/117, 359/135

[56] References Cited

U.S. PATENT DOCUMENTS 5,185,736  2/1993  Tyrrell et al. ............................. 370/55
5,283,785  2/1994  Ferguson .................................. 370/55

OTHER PUBLICATIONS

American National Standard for Telecommunications, Digital Hierarchy—Optical Interface Rates and Formats Specifications (SONET), Draft— Sep., 1990.

Primary Examiner—Melvin Marcelo
Attorney, Agent, or Firm—Kenyon & Kenyon

[57] ABSTRACT

An add-drop multiplexer having a plurality of OC—N and OC—M (M <N) interfaces and a drop and insertion unit. The drop and insertion unit includes a plurality of switch units corresponding to the second stage switch and a plurality of first and third stage time slot interchange circuits provided on the side of a plurality of low speed side interfaces. A multiplexing signal can be linked between low speed side transmission lines by using simple circuits.

10 Claims, 1 Drawing Sheet

ADD-DROP MULTIPLEXER

BACKGROUND OF THE INVENTION

The present invention relates to an add-drop multiplexer having a plurality of interface circuits for high and low speed side transmission lines for dropping a multiplexing signal from a high speed side signal and inserting a multiplexing signal into a high speed side signal, and more particularly to an add-drop multiplexer capable of linking a multiplexing signal between low speed side transmission circuits.

A conventional add-drop multiplexer capable of linking a multiplexing signal between low speed side transmission circuits may include a cross connect device having interface circuits for two high speed transmission lines and for a plurality of low speed transmission circuits. The cross connect device can link a multiplexing signal between arbitrary transmission lines so that a multiplexing signal can be linked between low speed side transmission lines.

SUMMARY OF THE INVENTION

As the speed of a transmission line becomes high, a cross connect device of a large capacity is required for realizing an add-drop multiplexing function. For example, in order to realize, by using a cross connect device, an add-drop multiplexer for a four-fiber bidirectional ring using high speed transmission lines of 10 Gb/s capacity, cross connect switches of 40 Gb/s or more are required for dealing with four 10 Gb/s signals and low speed side signals. However, since cross connect switches are configured so as to permit arbitrary time slot interchange between arbitrary interface circuits, it becomes more difficult to realize such a configuration as the capacity of cross connect switches becomes larger. A non-blocking cross connect device presently used in practice has a maximum capacity of only 30 Gb/s.

It is an object of the present invention to provide an add-drop multiplexer of large capacity capable of linking a multiplexing signal between low speed side transmission lines by using simple circuits instead of using cross connect switches.

In order to achieve the above object of the present invention, an add-drop multiplexer is provided which includes: a plurality of high speed side reception interfaces for receiving high speed side multiplexed signals from high speed side transmission lines; a plurality of high speed side transmission interfaces for transmitting high speed side multiplexed signals to high speed side transmission lines; a plurality of low speed side reception interfaces for receiving low speed side multiplexed signals from low speed side transmission lines; a plurality of low speed side transmission interfaces for transmitting low speed side multiplexed signals to low speed side transmission lines; and a drop and insertion unit for linking multiplexing signals multiplexed in signals received by the high and low speed side reception interfaces to the high and low speed transmission interfaces, the drop and insertion unit including: a plurality of first time slot interchange circuits for interchanging a time slot of a multiplexing signal of a signal received by a portion of the plurality of low speed side reception interfaces; a plurality of second time slot interchange circuits for interchanging a time slot of a multiplexing signal of a signal to be outputted to a portion of the plurality of low speed side transmission interfaces; and a spatial switch circuit having a function of selectively dropping a multiplexing signal multiplexed in a signal received by each high speed side reception interface and linking the dropped multiplexing signal to a corresponding one of the plurality of second time slot interchange units, a function of selectively inserting a signal from each of the plurality of first time slot interchange units into a signal received by a corresponding one of the plurality of high speed side reception interfaces for linking to a corresponding one of the plurality of high speed side transmission interfaces, and a function of selectively linking a signal from each of the plurality of first time slot interchange units to a corresponding one of the plurality of second time slot interchange units.

The high speed side reception interface receives a high speed side multiplexed signal from the high speed side transmission line, and sends it to the spatial switch circuit. The spatial switch circuit selectively drops a multiplexing signal multiplexed in a signal received by the high speed side reception interface, and links it to the second time slot interchange circuit without interchanging the time slot. The second time slot interchange circuit interchanges the time slot of the dropped multiplexing signal, and thereafter transmits via the low speed side transmission interface to the low speed side transmission line. In this manner, the drop function is realized. The spatial switch circuit links a multiplexing signal other than the dropped signal to another high speed side transmission line without interchanging the time slot. In this manner, a relay function of a multiplexing signal between high speed side transmission lines is realized. For a multiplexing signal to be both dropped and relayed, the spatial switch circuit links the dropped signal also to another high speed side transmission line.

The low speed side reception interface receives a low speed side multiplexed signal from the low speed side transmission line, and sends it to the first time slot interchange circuit. The first time slot interchange circuit interchanges the time slot of a multiplexing signal for the low speed side transmission line, and thereafter sends it to the spatial switch circuit. The spatial switch circuit selectively links the multiplexing signal for the low speed side transmission line received from the first time slot interchange circuit to the second time slot interchange circuit. In this manner, the multiplexing signal for the low speed side transmission line is selectively linked to another low speed side transmission line. It is therefore possible to link a multiplexing signal between the low speed side transmission lines.

DETAILED DESCRIPTION

Figure 1:
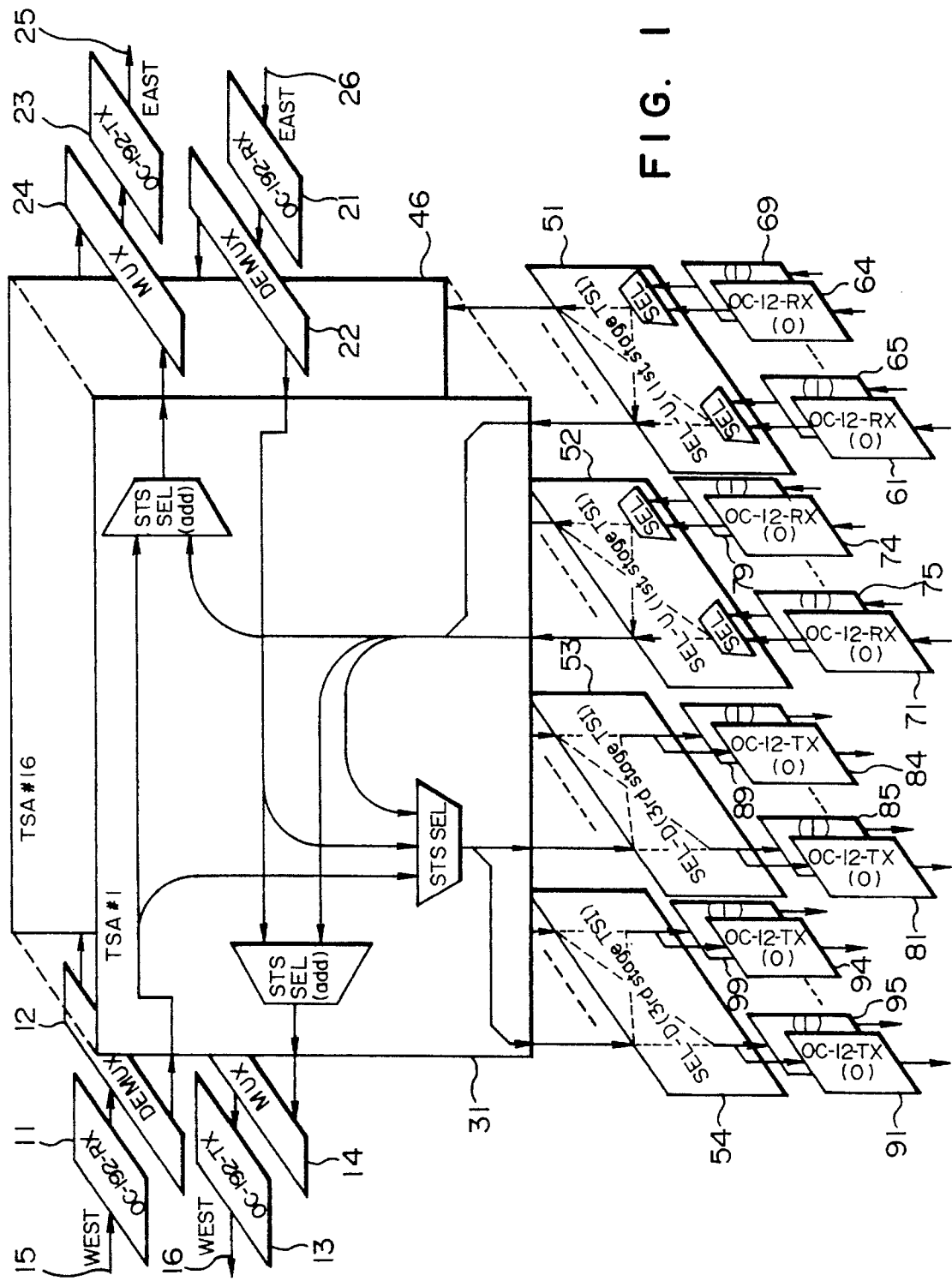
FIG.1 is a block diagram showing the structure of an add-drop multiplexer according to an embodiment of the invention.

An embodiment of the invention will be described with reference to FIG.1 which shows the structure of an add-drop multiplexer. This multiplexer is constituted by OC-192 receivers 11 and 21 as high speed side reception interfaces, OC-192 transmitters 13 and 23 as high speed side transmission interfaces, multiplexer circuits 14 and 24, separator or demultiplexing circuits 12 and 22, OC-12 receivers 61 to 69 and 71 to 79 as low speed side reception interfaces, OC-12 transmitters 81 to 89 and 91 to 99 as low speed side transmission interfaces, first time slot interchange circuits 51 and 52, second time slot interchange circuits 53 and 54, and partial spatial switch circuits 31 to 46.

The OC-12 transmitters and OC-12 receivers as well as OC-12 transmission lines are made to be duplex. As a redundancy structure of OC-192 transmission lines, a two-fiber ring bidirectional line switching scheme defined by ANSI is used.

OC-192 and OC-12 are transmission formats having transmission capacities of about 10 Gb/s and 600 Mb/s respectively defined by ANSI T1.105. In OC-192, 192 STS-1 signals are multiplexed. In OC-12, 12 STS-1 signals are multiplexed.

The first time slot interchange circuits 51 and 52, second time slot interchange circuits 53 and 54, and partial spatial switch circuits 31 to 46 are made of cross point switches of the STS-1 unit.

Next, the operation of the embodiment will be described.

An OC-192 multiplexed signal received by the OC-192 receiver 11 from a West side OC-192 transmission line 15 is separated into 16 time slots by the separator 12 and thereafter sent to corresponding ones of the partial spatial switch circuits 31 to 46. Reception of an East side OC-192 signal is performed in the same manner. The partial spatial switch circuits 31 to 46 selectively drop the 192 STS-1 signals duplexed in the OC-192 reception signal, and link the dropped STS-1 signals to the second time slot interchange circuit 53 or 54 without interchanging the time slots. The second time slot interchange circuit 53, (54) interchanges the time slots of the dropped STS-1 signals, and transmits them via the OC-12 transmitter to the low speed side transmission path. In this manner, a function is realized for dropping an STS-1 signal from the OC-192 transmission line to the OC-12 transmission line.

The partial spatial switch circuits 31 to 46 also link the STS-1 signals other than the dropped STS-1 signals to the other transmission side OC-192 transmitter. In this manner, a function is realized for relaying an STS-1 signal between OC-192 transmission lines. If an STS-signal is dropped and relayed at the same time, a corresponding one of the partial spatial switch circuits 31 to 46 links the dropped STS-1 signal also to the other transmission side OC-192 transmitter.

The OC-12 receivers 61 to 69 receive OC-12 signals from OC-12 transmission lines and send them to the first time slot interchange circuit 51, 52 which selects reception signals from transmission lines to be selected among the transmission lines of the redundancy structure of OC-12 transmission lines, interchanges the time slots of the STS-1 signals received from the selected OC-12 transmission lines, and sends them to the partial spatial switch circuits 31 to 46. The partial spatial switch circuits 31 to 46 selectively multiplex the STS-1 signals from the OC-12 transmission lines into an OC-192 multiplexed signal and link it to the OC-192 transmitter 13 or 23. In this manner, a function is realized for inserting an STS-1 signal from the OC-12 transmission line into the OC-192 transmission line. The partial spatial switch circuits 31 to 46 selectively link STS-1 signals received via the first time slot interchange circuit 51, 52 from OC-12 transmission lines to the second time slot interchange circuit 53, 54. In this manner, each STS-1 signal on an OC-12 transmission line can be selectively linked to another OC-12 transmission line. It is therefore possible to link an STS-1 signal between OC-12 transmission lines.

According to the present invention, a multiplexing signal is linked between low speed side transmission lines by using a combination of small scale switches. It is therefore possible to relatively easily configure an add-drop multiplexer of large capacity capable of linking a multiplexing signal between low speed side transmission lines.

What is claimed is:

1. An add-drop multiplexer comprising:
 a plurality of high speed side reception interfaces that receive high speed side multiplexed signals from high speed side transmission lines;
 a plurality of high speed side transmission interfaces that transmit high speed side multiplexed signals to high speed side transmission lines;
 a plurality of low speed side reception interfaces that receive low speed side multiplexed signals from low speed side transmission lines;
 a plurality of low speed side transmission interfaces that transmit low speed side multiplexed signals to low speed side transmission lines; and
 a drop and insertion unit linking multiplexing signals multiplexed in signals received by the high and low speed side reception interfaces to the high and low speed transmission interfaces,
 the drop and insertion unit including:
  a plurality of first time slot interchange circuits that interchange a time slot of a multiplexing signal of a signal received by a portion of the plurality of low speed side reception interfaces;
  a plurality of second time slot interchange circuits that interchange a time slot of a multiplexing signal of a signal to be transmitted to a portion of the plurality of low speed side transmission interfaces; and
  a switch circuit coupled to said plurality of first time slot interchange circuits and to said plurality of second time slot interchange circuits;
 whereby said switch circuit selectively drops a multiplexing signal multiplexed in a signal received by each high speed side reception interface and links the dropped multiplexing signal to a corresponding one of the plurality of second time slot interchange units, and said switch circuit selectively inserts a signal from each of the plurality of first time slot interchange units into a signal received by a corresponding one of the plurality of high speed side reception interfaces for linking to a corresponding one of the plurality of high speed side transmission interfaces, and said switch circuit selectively links a signal from each of the plurality of first time slot interchange units to a corresponding one of the plurality of second time slot interchange units.

2. An add-drop multiplexer according to claim 1, wherein said high speed side multiplexed signal is an optical carrier level N signal.

3. An add-drop multiplexer according to claim 2, wherein said low speed side multiplexed signal is an optical carrier level M (M <N) signal.

4. An add-drop multiplexer according to claim 2, wherein the unit of time slot interchange, drop, and insertion by said drop and insertion unit is Synchronous Transport Signal level 1 (STS-1).

5. An add-drop multiplexer according to claim 3, wherein the unit of time slot interchange, drop, and insertion by said drop and insertion unit is Synchronous Transport Signal level 1 (STS-1).

6. An add-drop multiplexer according to claim 1, wherein if said low speed side transmission lines have a redundancy structure of one working low speed side transmission line and one protection low speed side transmission line, or N working low speed side transmission lines and one protection low speed side transmission line, said first and second time slot interchange circuits switch between the working and protection low speed side transmission lines.

7. An add-drop multiplexer according to claim 1, wherein if said high speed side transmission lines have a redundancy structure of one working high speed side transmission line and one protection high speed side transmission line, said switch circuit switches between the working and protection high speed side transmission lines.

8. An add-drop multiplexer according to claim 1, wherein said switch circuit switches between said high speed side multiplexed signals of a ring type transmission switching scheme.

9. An add-drop multiplexer according to claim 1, wherein said switch circuit includes a plurality of partial switch circuits each dropping and inserting a time slot in a different specific range of said high speed side multiplexed signal.

10. An add-drop multiplexer according to claim 9, wherein said partial switch circuit is a cross point switch.

* * * * *

UNITED STATES PATENT AND TRADEMARK OFFICE
CERTIFICATE OF CORRECTION

PATENT NO. : 5,586,115
DATED : 17 December 1996
INVENTOR(S) : Yukio NAKANO et al.

It is certified that error appears in the above-indentified patent and that said Letters Patent is hereby corrected as shown below:

| Column | Line | |
|---|---|---|
| 1 | 56 | Change "interfaces," to --interfaces.--. |
| 1 | 57 | Change "the drop" to --The drop--; change "including:" to --includes:--. |
| 1 | 64 | Change "circuit having" to --circuit. This spatial switch circuit has--. |
| 2 | 60 | Change "OC-192" to --OC-192--. |
| 2 | 63 | Change "OC-12" to --OC-12--. |
| 3 | 1 | Change "OC-12" to --OC-12-- (two occurrences). |
| 3 | 20 | Change "OC-192" to --OC-192--. |
| 3 | 30 | Change "OC-12" to --OC-12--. |

UNITED STATES PATENT AND TRADEMARK OFFICE
CERTIFICATE OF CORRECTION

PATENT NO.  : 5,586,115
DATED       : 17 December 1996
INVENTOR(S) : Yukio NAKANO et al.

It is certified that error appears in the above-indentified patent and that said Letters Patent is hereby corrected as shown below:

| Column | Line | |
|---|---|---|
| 3 | 64 | Delete "pos-". |
| 3 | 65 | Delete "sible to"; change "easily" to --easy to--. |

Signed and Sealed this

Twenty-fourth Day of June, 1997

Attest:

BRUCE LEHMAN

Attesting Officer

Commissioner of Patents and Trademarks